United States Patent [19]

Katamachi

[11] Patent Number: 5,628,301
[45] Date of Patent: May 13, 1997

[54] WIRE TRAVERSE APPARATUS OF WIRE SAW

[75] Inventor: Shozo Katamachi, Mitaka, Japan

[73] Assignee: Tokyo Seimitsu Co., Ltd., Tokyo, Japan

[21] Appl. No.: 680,235

[22] Filed: Jul. 11, 1996

[30] Foreign Application Priority Data

Jul. 14, 1995 [JP] Japan ................................. 7-178765

[51] Int. Cl.$^6$ ........................................................ B28D 1/08
[52] U.S. Cl. ..................... 125/21; 125/16.01; 125/16.02; 83/651.1
[58] Field of Search ........................... 125/16.01, 16.02, 125/21; 83/651.1, 367.1; 451/489

[56] References Cited

U.S. PATENT DOCUMENTS

| | | | |
|---|---|---|---|
| 3,831,576 | 8/1974 | Mech | 125/16.01 |
| 3,841,297 | 10/1974 | Mech | 125/21 |
| 3,942,508 | 3/1976 | Shimizu | 125/16.01 |
| 4,494,523 | 1/1985 | Wells | 125/16.01 |
| 4,655,191 | 4/1987 | Wells et al. | 125/16.01 |
| 4,765,307 | 8/1988 | Kubo | 125/21 |
| 4,903,682 | 2/1990 | Kurokawa | 125/16.01 |
| 5,052,366 | 10/1991 | Matsukura | 125/16.01 |
| 5,201,305 | 4/1993 | Takeuchi | 125/16.02 |
| 5,269,285 | 12/1993 | Toyama et al. | 125/16.02 |

*Primary Examiner*—Willis Little
*Assistant Examiner*—Eileen P. Morgan
*Attorney, Agent, or Firm*—Sixbey, Friedman, Leedom & Ferguson, P.C.; David S. Safran

[57] ABSTRACT

A wire is put on a guide roller, which guides the wire in a direction of a wire reel's axis. A wire load, which changes according to the displacement of the supply angle of the wire on the guide roller, is detected sequentially. Then, the guiding speed of the guide roller is sequentially controlled to adjust the wire displacement. Therefore, when the displacement of the wire supply angle changes, the guiding speed of the wire can quickly respond to the change.

3 Claims, 4 Drawing Sheets

WIRE TRAVERSE APPARATUS OF WIRE SAW

BACKGROUND OF THE INVENTION

1. Field of the Invention

The present invention relates to a wire traverse apparatus of a wire saw, and more particularly to a wire traverse apparatus of a wire saw, which slices a workpiece such as a semiconductor ingot, a ceramic, a glass, etc. into a large number of wafers by a running wire.

2. Description of the Related Art

A wire saw is one of apparatuses which slice a workpiece such as a semiconductor ingot, a ceramic, a glass, etc. into wafers. In the wire saw, a wire is supplied from one wire reel, and is wound on a plurality of grooved rollers to form wire rows. Then, the wire is wound up by the other wire reel. The processing solution including abrasive grains is supplied to the wire rows, and the workpiece is pressed on the wire row, so that the workpiece is sliced into a large number of wafers by the lapping operation of the abrasive grains.

In the above-mentioned wire saw, a wire traverse apparatus is provided near each wire reel. The wire traverse apparatus guides the wire, which is wound up the wire reel, and the wire, which is supplied from the wire reel, in the direction of the wire reel's axis.

The wire is wound up by the wire reel in a spiral, so the wire moves in the direction of the wire reel's axis when the wire is supplied from the wire reel. For example, if the wire is wound up by the wire reel irregularly, the change in the wire moving speed occurs when the wire is supplied.

On the other hand, the wire traverse apparatus is provided with a slider, which moves in the direction of the wire reel's axis. A pair of detectors are provided at a predetermined interval in the slider. The wire is arranged between these two detectors. When there is a difference in the moving speed between the wire and the slider, the wire touches one of the detectors. Then, the wire guiding speed is controlled based on a touch signal transmitted from the detector the wire touches, so that the wire no longer touches the detector.

The above-mentioned traverse apparatus controls the wire guiding speed when the wire touches the pair of detectors. There is another wire traverse apparatus, which controls the wire guiding speed based on a rotational speed of a touch roller.

In this wire traverse apparatus, a pair of touch rollers are rotatably supported by a slider at a predetermined interval. In this case, if there is a difference in the moving speed between the wire and the pair of touch rollers, the wire, which is arranged between the touch rollers, touches the touch roller. As a result, the touch rollers are rotated. Then, the number of rotations when the wire touches the touch roller is detected, and the moving speed of the pair of touch rollers for guiding the wire is controlled according to the detected number of rotations.

However, the wire traverse apparatus, which controls the wire guiding speed when the wire touches the pair of detectors, detects the gap in the moving speed between the wire and the pair of detectors. Therefore, the detectors become worn because the wire touches them, so the accuracy in detecting the speed gap lowers. Moreover, there is a time lag from the wire and the touch roller are released from each other to the rotation of the touch roller is stopped. So, there is a problem in that the pair of the touch rollers cannot quickly respond to the change in the wire moving speed. In particular, when the problem becomes more serious, a hunting occurs in the pair of the touch rollers.

SUMMARY OF THE INVENTION

The present invention has been developed in view of the above-described circumstances, and has its object the provision of a wire traverse apparatus of a wire saw, in which a wire guiding speed can quickly respond to a change in a wire moving speed.

In order to achieve the above-mentioned object, a wire traverse apparatus of a wire saw, which moves in a direction of a wire reel's axis following a wire supplied from or wound up by the wire reel, and which guides the wire so that supply or windup angle is substantially a right angle to a longitudinal direction of the wire reel; is characterized in that the wire is wound on a guide roller which guides the wire in the direction of the wire reel's axis, the detectors sequentially detect the displacement of the supply or windup angle of the wire wound on the guide roller, and the wire guiding speed of the guide roller is controlled based on the detected displacement of the wire supply or windup angle, so that the wire supply or windup angle can be substantially a right angle.

According to the present invention, the guiding speed of the guiding roller is controlled based on the displacement of the sequentially-detected wire supply or windup angle. Therefore, the displacement of the wire supply or windup angle changes as the moving speed of the wire moving in the direction of the wire reel's axis, the wire guiding speed can quickly respond to the change in the displacement.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
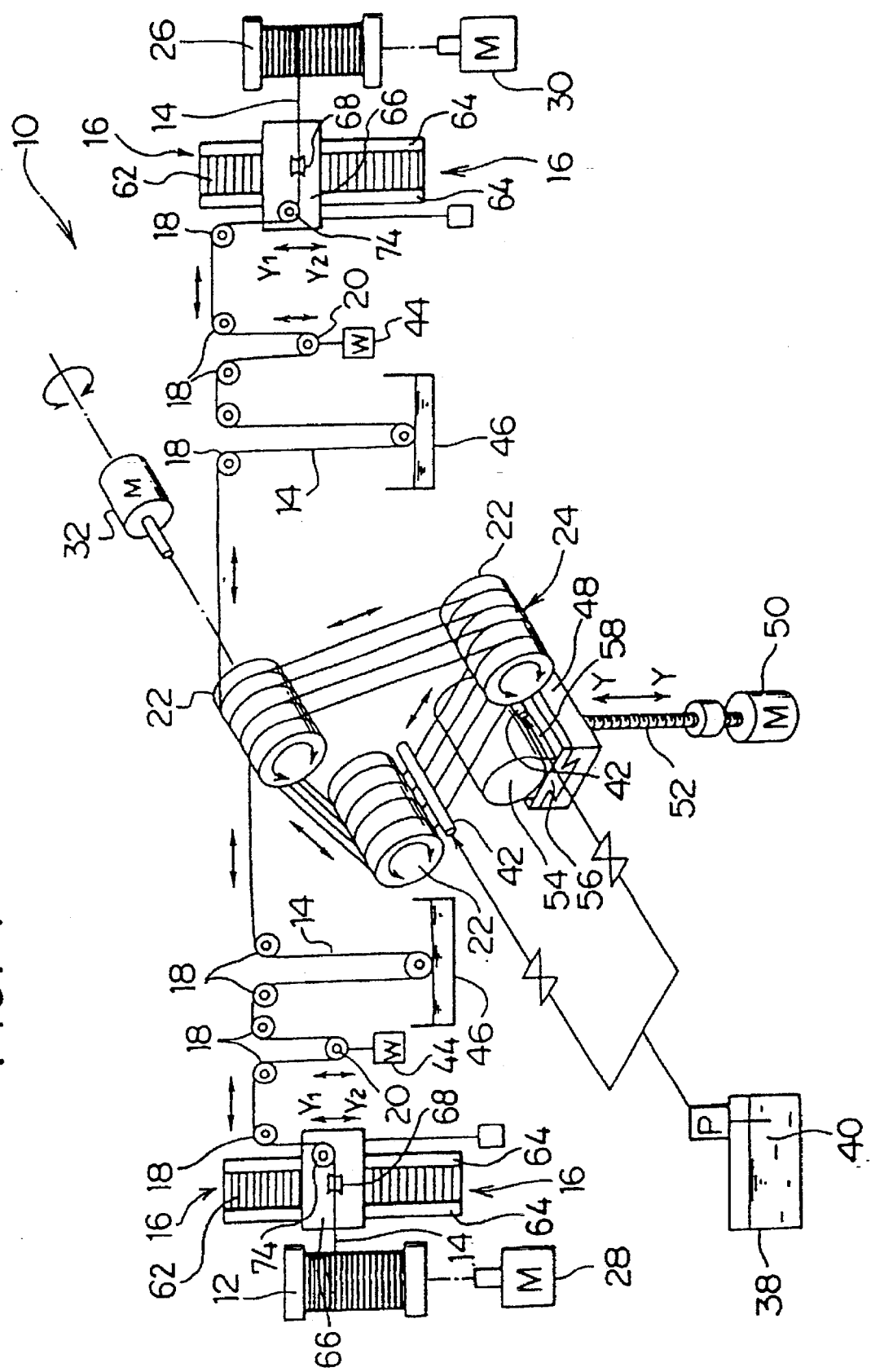
FIG. 1 is a view illustrating the entire wire saw according to the present invention.

FIG. 1 is a view illustrating the whole structure of a wire saw 10. A wire 14, which is wound around one wire reel 12, is wound around three grooved rollers 22, 22 and 22 to form a wire row 24 via a later-described wire traverse apparatus 16, fixed guide rollers 18 and 18, and a dancer roller 20. Then, the wire 14 is wound up by the other wire reel 26 via the fixed guide rollers 18 and 18, the dancer roller 20, and the wire traverse apparatus 16.

A weight 44 of a predetermined weight is hang from the dancer roller 20, and it applies a predetermined tension to the running wire 14 at all times.

Wire cleansing apparatuses 46 and 46 are provided halfway on the wire running path. The wire cleansing apparatuses 46 and 46 remove the processing solution 40 adhered to the wire 14.

The wire reels 12 and 26 connect to driving motors 28 and 30, respectively, which are able to rotate in forward and backward directions. One of the three grooved rollers 22, 22, and 22 connects to a driving motor 32, which is able to rotate in both forward and backward directions. If the driving motors 28, 30, and 32 are driven, the wire 14 runs back and forth between one wire reel 12 and the other wire reel 26.

The wire row 24 is supplied with the processing solution 40, which is stored in a processing solution storage tank 38, by a wheel solution supplying nozzle 42. A semiconductor ingot 54, which is to be processed, is supported by a work feed table 48 below the wire row 24 via an ingot mounting block 56 and a slice base mounting beam 58. The work feed table 48 is driven by a ball screw 52, which is rotated by a motor 50, to move up and down freely. The work feed table 48 is moved up so that the semiconductor ingot 54 can be abutted against the wire row, which is running at a high speed. The semiconductor ingot 54, which is abutted against the wire row 24, is sliced into a large number of wafers by a lapping operation of the processing solution 40.

Next, an explanation will be given about the above-mentioned wire traverse apparatus 16. The wire traverse apparatuses 16 is provided near one wire reel 12 and the other wire reel 26. Because these two wire traverse apparatuses 16 are constructed in the same manner, the wire traverse apparatus 16 near the wire reel 26 is only explained at present. An explanation about the wire traverse apparatus 16 near the wire reel 12 is omitted here.

Figure 2:
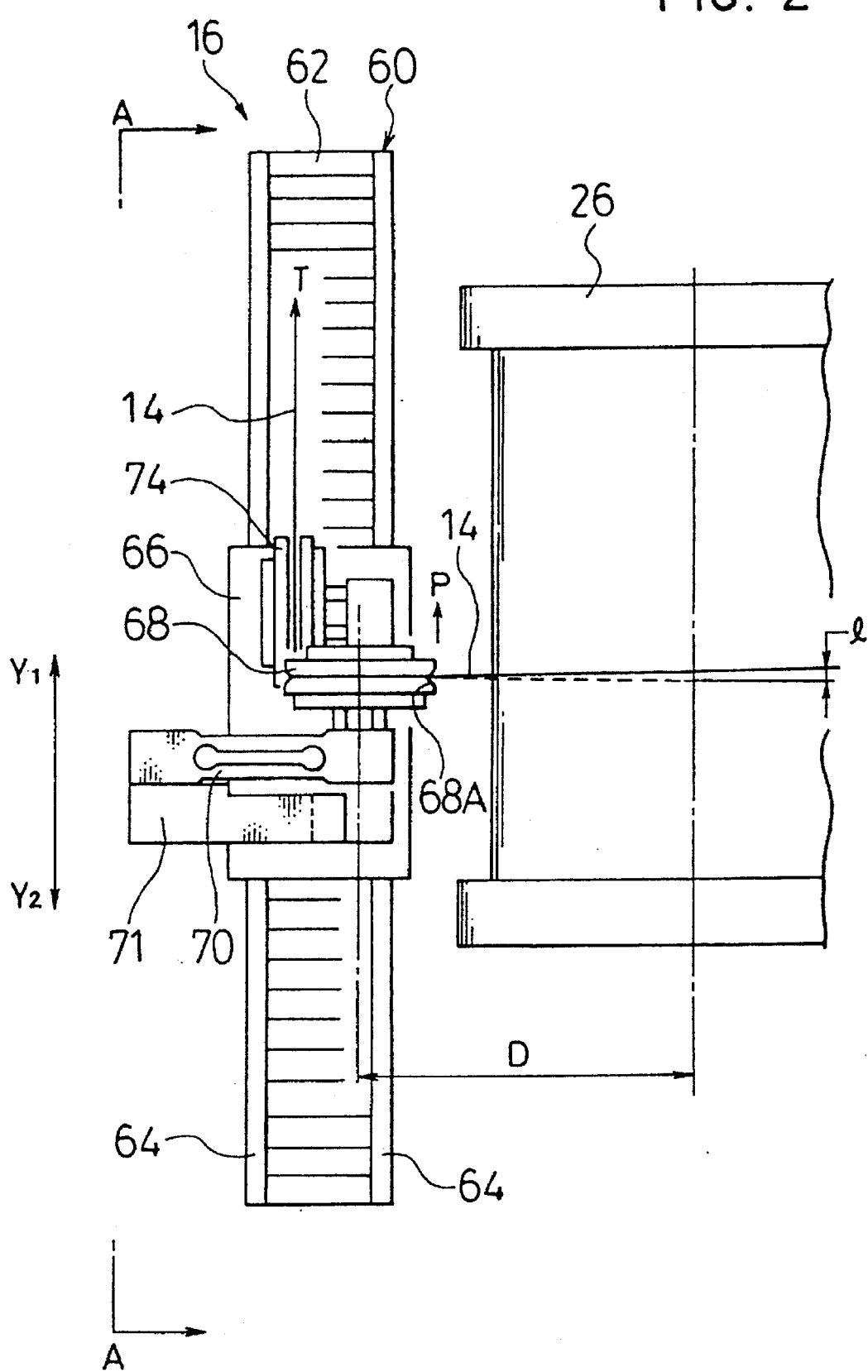
FIG. 2 is a side view illustrating the wire traverse apparatus of the wire saw according to the present invention.

As shown in FIG. 2, a linear motor 60 of the wire traverse apparatus 16 is arranged parallel to the left side of the wire reel 26. Guide rails 64 and 64 are provided at both sides of a stator 62 of the linear motor 60. A slider 66 is supported by the guide rails 64 and 64 in such a manner to move freely in the direction of an arrow $Y_1-Y_2$. Then, the exciting current is sent into a coil of the slider 66, so that the slider 66 can move in the direction of the arrow $Y_1-Y_2$ along the guide rails 64 and 64.

Figure 3:
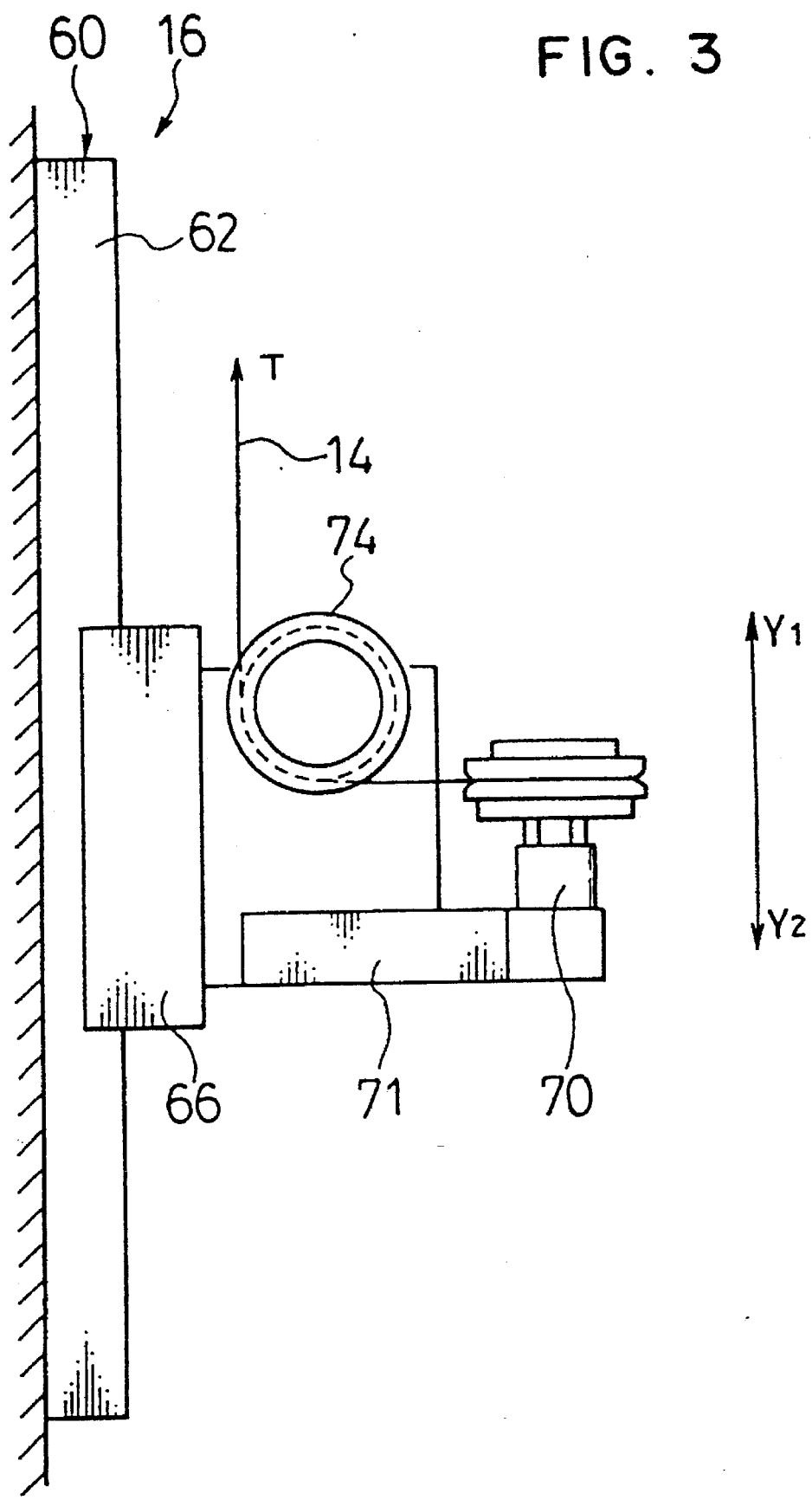
FIG. 3 is a view along line III—III in FIG. 2.
Figure 4:
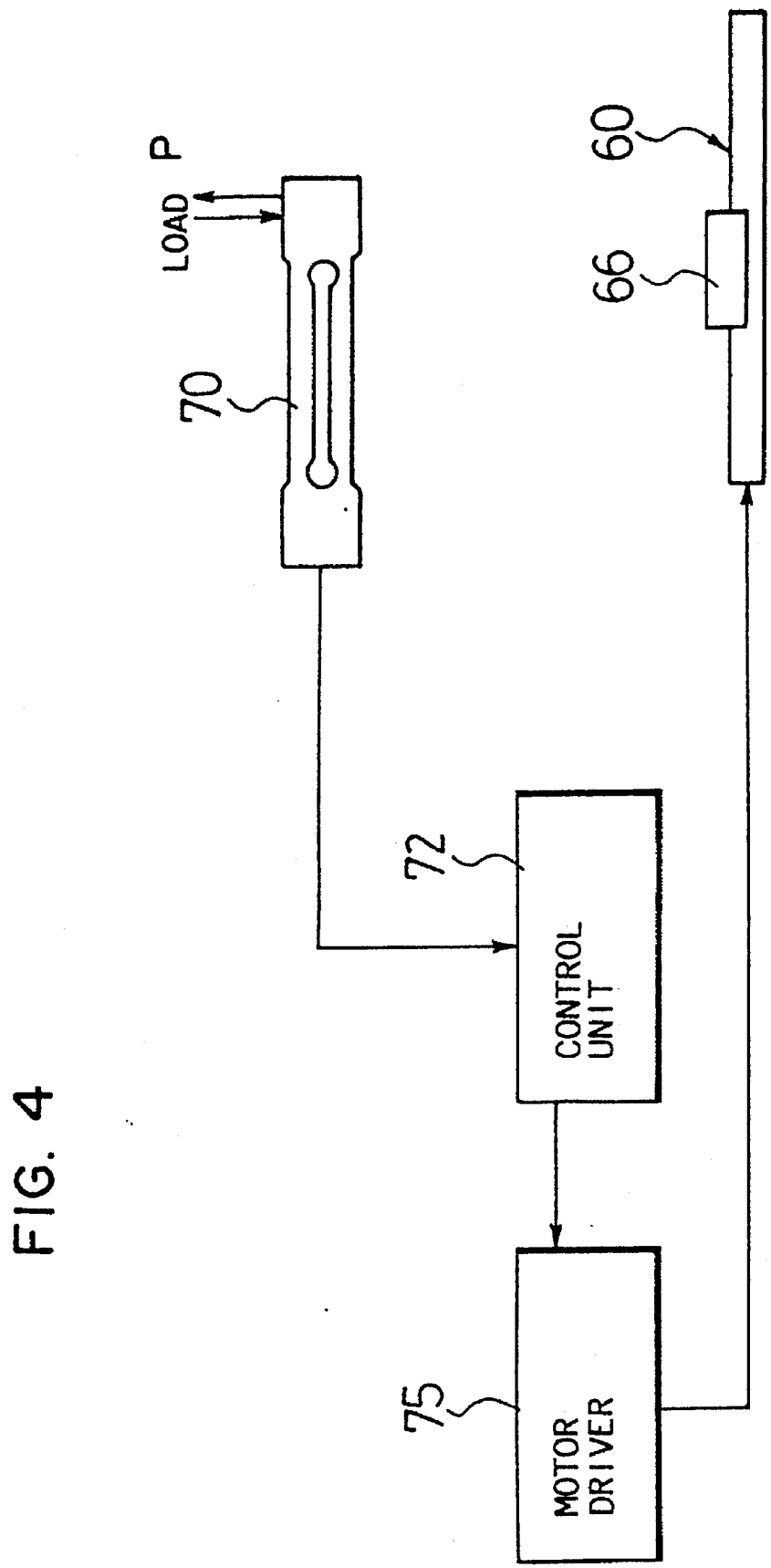
FIG. 4 is a view illustrating the entire structure of the wire traverse apparatus of the wire saw according to the present invention.

The wire traverse apparatus 16 is provided with a guide roller 68, a load cell (a detecting part) 70, and a control part 72 (see FIG. 4). The guide roller 68 is arranged on the left side of the wire reel 26, and an axis of the guide roller 68 is arranged parallel to that of the wire reel 26. The guide roller 68 is rotatably supported by the right end of a later-described load cell 70. A groove 68A is formed at the outer circumference of the guide roller 68, and the wire 14 is wound around the groove 68A. The wire 14 wound around the groove 68A is guided to the fixed guide roller 18, which is explained with reference to FIG. 1, by a guide roller 74 (see FIG. 3).

The wire 14 is wound up by the wire reel 26 in a spiral. If the wound-up wire 14 is supplied by the wire reel 26, the wire 14 moves by l in the direction of the wire reel 26's axis (that is, a supply angle of the wire 14 is displaced by a predetermined angle from a substantially right angle). In this case, if the wire 14's tension is T, the load P is applied to the guide roller 68 in the direction of the arrow. The load P is calculated by the following equation.

$$P=T\times(l/D)$$

D: a distance between a center of the wire reel 26 and that of the guide roller 68

In the above-mentioned load cell 70, the guide roller 68 is rotatably supported by the right end, and the slider 66 is fixed to the left end via the block 71. Therefore, if the wire 14 is supplied from the wire reel 26, the load P is applied to the right end of the load cell 70 in the direction of the arrow (see FIG. 2) in the case when the load P is applied to the guide roller 68 in the direction of the arrow (see FIG. 4). As a result, the load cell 70 is strained to change its form, and the load cell 70 outputs an electric signal corresponding to the load P.

The control unit 72 controls the moving speed of the slider 66 so that the load P from the load cell 70 can be zero. As a result, the wire 14, which is put on the guide roller 68, is controlled, and the wire 14 is supplied at a right angle to the direction of the wire reel's axis 26. Incidentally, 75 in FIG. 4 is a motor driver.

An explanation will hereunder be given about the operation of the wire traverse apparatus of the wire saw, which is constructed in the above-mentioned manner, in the above-described embodiment.

First, the wire 14 is supplied from the wire reel 26. In this case, the wire 14 is wound up by the wire reel 26 in a spiral. The wire 14 is aslant on the wire reel 26. Therefore, if the wire 14 is supplied from the wire reel 26, the wire 14 moves by l (the length in which the wire 14 is wound up in spiral) in the direction of the wire reel 26's axis. As a result, the load P (see FIG. 2) acts on the guide roller 58 in the direction of the arrow.

When the load P acts on the guide roller 68 in the direction of the arrow, the load P (see FIG. 2) acts on the right end of the load cell 70 in the direction of the arrow. As a result, the load cell is strained to change its form, and outputs an electric signal corresponding to the charge P. A control unit 72 receives the electric signal from the load cell 70.

The control unit 72 controls a moving speed of the slider 66 based on the electric signal from the load cell 70 so that the load P acting on the load cell 70 can be zero. That is, the control unit 72 obtains the moving speed of the slider 66 so that the load P acting on the load cell 70 can be zero. Then, the control unit 72 outputs an instruction signal to a motor driver 75 in order to move the slider 66 at the obtained moving speed. The motor driver 75 moves the slider of the linear motor 60 at an instructed speed based on the instruction signal from the control unit 72. As a result, the wire 14 is supplied from the wire reel 26 in such a state that the supply angle is substantially a right angle, and the displacement of the wire 14 can be corrected.

In the above-described embodiment, the explanation is given about the case when the wire 14 is supplied from the wire reel 26 in the wire traverse apparatus of the wire saw according to the present invention. However, the present invention is not limited to this. The wire traverse apparatus can be applied in the case when the wire reel 14 is wound up by the wire reel 26.

As has been described above, according to the wire traverse apparatus of the wire saw of the present invention, the guiding speed of the guide roller is controlled based on the displacement of the wire's supply angle or windup angle detected sequentially. So, the change in the displacement of the wire's supply angle or windup angle can be detected regardless of the stage. Therefore, when the moving speed of the wire, which moves in the direction of the wire reel's axis, changes, and when the displacement of the wire's supply angle or windup angle changes, the guiding speed of the wire can respond to the displacement change. As a result, the proper guiding speed of the wire can be controlled.

Moreover, the guide roller is provided with a wire displacement detecting mechanism for detecting the wire's displacement with regard to the guide roller. So, the guide roller and the wire reel can come closer to each other. Therefore, the wire traverse apparatus can be compact, and the accuracy of the wire windup pitch can be improved when the wire is wound up by the wire reel. The accuracy in detecting the wire displacement is improved, too.

Furthermore, if the load applied to the guide roller is detected, the wire's displacement with regard to the guide roller can be detected. As a result, the detecting part does not have to touch the wire, so the detector can be prevented from being wasted.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A wire traverse apparatus of a wire saw which moves following a wire supplied from or wound up by a wire reel of the wire saw and guides the wire so that a wire supply or windup angle is substantially a right angle to a longitudinal direction of the wire reel; said wire transfer apparatus comprising:

a guide roller for guiding the wire onto or from the wire reel, the guide roller moving axially, parallel to the longitudinal axis of the wire reel;

detecting means for detecting a displacement of the supply or windup angle of the wire on the guide roller; and control means for controlling the speed of movement of the guide roller based on the detected displacement of the wire supply or windup angle so that the wire supply or windup angle is substantially a right angle.

2. The wire traverse apparatus of the wire saw according to claim 1, wherein the detecting means is a load cell, the guide roller is supported by the load cell, and the displacement of the wire supply or windup angle is detected as a load applied to the load cell.

3. The wire traverse apparatus of the wire saw according to claim 2, wherein the load cell is strained to change its form, and the load cell outputs an electric signal corresponding to the change in the form.

* * * * *